(12) United States Patent
Morosawa et al.

(10) Patent No.: US 11,279,320 B2
(45) Date of Patent: Mar. 22, 2022

(54) ENTRY SUPPORT SYSTEM, ENTRY SUPPORT METHOD, AND STORAGE MEDIUM

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/329,481

(22) Filed: May 25, 2021

(65) Prior Publication Data

US 2021/0370873 A1    Dec. 2, 2021

(30) Foreign Application Priority Data

May 27, 2020    (JP) .............................. JP2020-092476

(51) Int. Cl.
*B60R 25/24*    (2013.01)
*G07C 9/37*    (2020.01)
(Continued)

(52) U.S. Cl.
CPC ............ *B60R 25/241* (2013.01); *B60R 25/01* (2013.01); *B60R 25/31* (2013.01);
(Continued)

(58) Field of Classification Search
CPC ....... B60R 25/241; B60R 25/01; B60R 25/31; G07C 9/37; G07C 9/38; G06K 9/00926; G06K 9/00295
See application file for complete search history.

(56) References Cited

U.S. PATENT DOCUMENTS 10,525,850 B1 *  1/2020  Tang ..................... B60W 40/08
10,906,509 B1 *  2/2021  Turk .................. G06K 7/10297
(Continued)

FOREIGN PATENT DOCUMENTS

JP    2003-138817    5/2003

*Primary Examiner* — Thomas D Alunkal
(74) *Attorney, Agent, or Firm* — Rankin, Hill & Clark LLP

(57) ABSTRACT

An entry support system includes: a first identification information acquisition unit which acquires first identification information of a first related person in a first predetermined relation with a registered user; a first related person authentication unit which determines whether or not an externally located person is the first related person when the externally located person is recognized by an externally located person recognition unit in a state where an internal user determined as the registered user by a registered user authentication unit is recognized by an internal user recognition unit; and an entry permission unit which executes entry permission processing for enabling entry of the externally located person to a closed space from an entrance, when the externally located person is determined as the first related person by the first related person authentication unit.

6 Claims, 8 Drawing Sheets

(51) Int. Cl.
*G06K 9/00* (2022.01)
*B60R 25/01* (2013.01)
*B60R 25/31* (2013.01)
*G07C 9/38* (2020.01)

(52) U.S. Cl.
CPC ........... *G06K 9/00926* (2013.01); *G07C 9/37* (2020.01); *G07C 9/38* (2020.01); *G06K 9/00295* (2013.01)

(56) References Cited

U.S. PATENT DOCUMENTS

| | | | |
|---|---|---|---|
| 2017/0116804 A1* | 4/2017 | Bae | G07C 9/00563 |
| 2018/0068510 A1* | 3/2018 | Atsumi | G07C 1/32 |
| 2018/0208204 A1* | 7/2018 | Chen | G06F 1/163 |
| 2018/0363338 A1* | 12/2018 | Ichinose | B60R 25/24 |

* cited by examiner

ENTRY SUPPORT SYSTEM, ENTRY SUPPORT METHOD, AND STORAGE MEDIUM

INCORPORATION BY REFERENCE

The present application claims priority under 35 U.S.C. § 119 to Japanese Patent Application No. 2020-092476 filed on May 27, 2020. The content of the application is incorporated herein by reference in its entirety.

BACKGROUND OF THE INVENTION

Field of the Invention

The present invention relates to an entry support system, an entry support method and a storage medium.

Description of the Related Art

Conventionally, an entry system which performs individual authentication of an object approaching a vehicle by a photographed image of vehicle surroundings by a camera and permits entry to the vehicle is known (for example, see Japanese Patent Laid-Open No. 2003-138817). The entry system identifies whether or not the object is a user according to coincidence between iris data of the object recognized from an image of the object approaching the vehicle and iris data of the user registered beforehand.

According to the entry system, entry to a vehicle is permitted by biometric authentication for a user registered beforehand but the entry is not permitted for an unregistered person. Therefore, for example, in a case where a registered user drives a vehicle to pick up an unregistered person such as a friend or an acquaintance, entry to the vehicle is not permitted even when the friend or the acquaintance approaches the vehicle, and it is troublesome that the user inside the vehicle has to unlock a door to enable the entry of the friend or the acquaintance.

The present invention is implemented in consideration of such a background, and an object is to provide an entry support system, an entry support method and a storage medium storing an entry support program capable of facilitating entry to a closed space such as a vehicle by an unregistered externally located person.

SUMMARY OF THE INVENTION

A first aspect for achieving the above-described object is an entry support system which supports entry of an externally located person to a closed space provided with an entrance, and the entry support system includes: an internal user recognition unit configured to recognize an internal user located inside the closed space; a registered user authentication unit configured to determine whether the internal user is a registered user for whom predetermined registration is performed or an unregistered user for whom the predetermined registration is not performed; a first identification information acquisition unit configured to refer to a first user database in which information of the registered user is recorded, and acquire first identification information which is identification information of a first related person in a first predetermined relation with the registered user; an externally located person recognition unit configured to recognize the externally located person located in an area around the closed space; a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and an entry permission unit configured to execute entry permission processing for enabling the entry of the externally located person to the closed space from the entrance when the externally located person is determined as the first related person by the first related person authentication unit.

The above-described entry support system may be configured such that the entry support system includes a first entry propriety confirmation unit configured to transmit first entry propriety confirmation information confirming propriety of the entry of a plurality of the externally located persons to a registered user terminal used by the registered user when the plurality of externally located persons are recognized by the externally located person recognition unit and at least one of the plurality of externally located persons is determined as not the first related person by the first related person authentication unit, and the entry permission unit executes the entry permission processing when first entry permission information instructing permission of the entry of the plurality of externally located persons is received in response to reception of the first entry propriety confirmation information from the registered user terminal.

The above-described entry support system may be configured such that the entry support system includes: a second identification information acquisition unit configured to refer to a second user database in which information of the unregistered user is recorded and acquire second identification information which is identification information of a second related person in a second predetermined relation with the unregistered user; a second related person authentication unit configured to determine whether or not the externally located person is the second related person based on the second identification information when the externally located person is recognized by the externally located person recognition unit in the state where the internal user determined as the unregistered user by the registered user authentication unit is recognized by the internal user recognition unit; and a second entry propriety confirmation unit configured to transmit second entry propriety confirmation information confirming the propriety of the entry of the externally located person to the registered user terminal used by the registered user when the externally located person is determined as the second related person by the second related person authentication unit, and the entry permission unit executes the entry permission processing when second entry permission information instructing permission of the entry of the externally located person is received in response to reception of the second entry propriety confirmation information from the registered user terminal.

The above-described entry support system may be configured such that the closed space is an interior of a vehicle, the entrance is a door of the vehicle, the predetermined registration is user registration of the vehicle, and the entry permission unit executes processing of unlocking the door of the vehicle as the entry permission processing.

A second aspect for achieving the above-described object is an entry support method executed by a computer in order to support entry of an externally located person to a closed space provided with an entrance, and the entry support method includes: an internal user recognition step of recognizing an internal user located inside the closed space; a registered user authentication step of determining whether the internal user is a registered user for whom predetermined registration is performed or an unregistered user for whom the predetermined registration is not performed; a first identification information acquisition step of referring to a first user database in which information of the registered user is recorded, and acquiring first identification information which is identification information of a first related person in a first predetermined relation with the registered user; an externally located person recognition step of recognizing the externally located person located in an area around the closed space; a first related person authentication step of determining whether or not the externally located person is the first related person based on the first identification information when the externally located person is recognized by the externally located person recognition step in a state where the internal user determined as the registered user by the registered user authentication step is recognized by the internal user recognition step; and an entry permission step of executing entry permission processing for enabling the entry of the externally located person to the closed space from the entrance when the externally located person is determined as the first related person by the first related person authentication step.

A third aspect for achieving the above-described object is a non-transitory computer-readable storage medium storing an entry support program which is executed by a processor of an entry support system for supporting entry of an externally located person to a closed space provided with an entrance, wherein the entry support program makes the processor functions as: an internal user recognition unit configured to recognize an internal user located inside the closed space; a registered user authentication unit configured to determine whether the internal user is a registered user for whom predetermined registration is performed or an unregistered user for whom the predetermined registration is not performed; a first identification information acquisition unit configured to refer to a first user database in which information of the registered user is recorded, and acquire first identification information which is identification information of a first related person in a first predetermined relation with the registered user; an externally located person recognition unit configured to recognize the externally located person located in an area around the closed space; a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and an entry permission unit configured to execute entry permission processing for enabling the entry of the externally located person to the closed space from the entrance when the externally located person is determined as the first related person by the first related person authentication unit.

According to the above-described entry support system, in the case where an unregistered externally located person approaches a closed space in the state where a registered user is located inside the closed space, when the externally located person is determined as a first related person in a first predetermined relation with the registered user by the first related person authentication unit, the entry permission processing for enabling entry of the externally located person from an entrance is executed by the entry permission unit. Thus, the entry to the closed space by the unregistered externally located person can be facilitated.

DETAILED DESCRIPTION OF THE PREFERRED EMBODIMENTS

1. Support Aspect of Entry to Vehicle by Entry Support System

Figure 1:
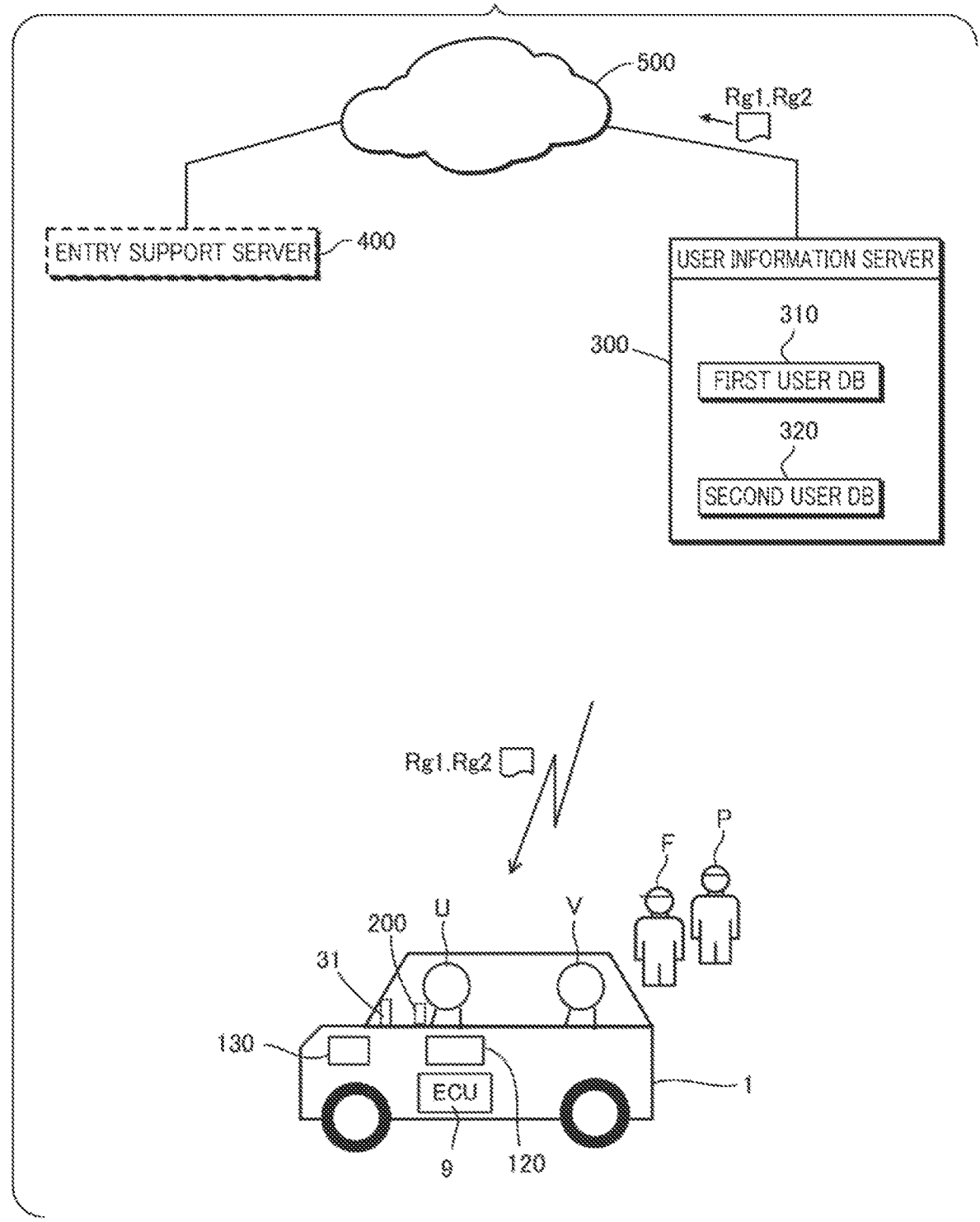
FIG. 1 is an explanatory drawing of a support aspect of entry to a vehicle by an entry support system.

With reference to FIG. 1, the support aspect of the entry to a vehicle 1 executed by an ECU (Electronic Control Unit) 9 loaded on the vehicle 1 will be explained. The ECU 9 includes a function of the entry support system of the present invention. An interior of the vehicle 1 is an example of a closed space provided with an entrance.

The ECU 9 executes entry permission processing for enabling the entry to the vehicle 1 when an externally located person in a predetermined relation with an internal user riding on the vehicle 1 is recognized, and supports the entry to the vehicle 1 by the externally located person. In FIG. 1, as the internal users riding on the vehicle 1, a registered user U who has performed predetermined registration for utilizing support processing of the entry to the vehicle 1 and an unregistered user V who has not performed the predetermined registration are indicated. The vehicle 1 includes a touch panel 31, a communication unit 120 (receiver/transmitter), and a navigation device 130.

The ECU 9 communicates with a user information server 300 including a processor, an antenna, a first user DB (Data Base) 310, and a second user DB 320 via a communication network 500 by the communication unit 120. In addition, the ECU 9 communicates with a user terminal 200 (such as a smartphone or a cellular phone) used by the registered user U directly or via the communication network 500. Note that, as to be described later, the entry support system may be configured by an entry support server 400 which includes a processor and an antenna, and which communicates with the vehicle 1 via the communication network 500. The communication 120 includes an antenna.

In the first user DB 310, information of a plurality of registered users including the registered user U is recorded. The information of the registered user includes first identification information Rg1 for identifying a first related person in a first predetermined relation with the registered user. The first predetermined relation is, for example, the relation of a family member, a friend and an acquaintance or the like. In addition, in the present embodiment, a face image of the first related person is used as the first identification information Rg1.

In the second user DB 320, information of a plurality of unregistered users including the unregistered user V is recorded. The information of the unregistered user includes second identification information Rg2 for identifying a second related person in a second predetermined relation with the unregistered user. The second predetermined relation is, for example, the relation of a family member, a friend and an acquaintance or the like. In addition, in the present embodiment, a face image of the second related person is used as the second identification information Rg2. Note that the user information server 300 may be a server which manages member information of an SNS (Social Networking Service), and in this case, the first user DB 310 and the second user DB 320 are included in a member DB of the SNS.

When externally located persons F and P located near the vehicle 1 are recognized from a photographed image of a vehicle exterior camera (details will be described later) which is provided on the vehicle 1 and photographs surroundings of the vehicle 1, the ECU 9 determines whether or not the externally located persons F and P are the first related person or the second related person based on the first identification information Rg1 and the second identification information Rg2.

Then, when it is determined that the externally located persons F and P are the first related persons, the ECU 9 executes the entry permission processing of opening a power door (details will be described later) of the vehicle 1. In addition, when it is determined that the externally located person F is the first related person but the externally located person P is not the first related person, the ECU 9 transmits first entry confirmation information confirming whether or not to permit the entry to the vehicle 1 to the touch panel 31 and the user terminal 200. The touch panel 31 and the user terminal 200 correspond to registered user terminals used by the registered user.

Then, when the ECU 9 receives first entry permission information instructing permission of the entry, the information being transmitted according to an operation of the registered user U from the touch panel 31 or the user terminal 200 which has received the first entry confirmation information, the ECU 9 executes the processing (corresponding to the entry permission processing) of opening the power door of the vehicle 1. Thus, the externally located person (registration unconfirmable person) P not determined as the first related person is prohibited from getting into the vehicle 1 without the permission of the registered user U.

In addition, when it is determined that the externally located persons F and P are the second related persons, the ECU 9 transmits second entry confirmation information confirming whether or not to permit the entry to the vehicle 1 to the touch panel 31 and the user terminal 200. Then, when the ECU 9 receives second entry permission information instructing the permission of the entry, the information being transmitted according to the operation of the registered user U from the touch panel 31 or the user terminal 200 which has received the second entry confirmation information, the ECU 9 executes the processing (corresponding to the entry permission processing) of opening the power door of the vehicle 1. Thus, for the second related person, the entry to the vehicle 1 can be permitted subject to the permission of the registered user U.

2. Configuration of Vehicle

Figure 2:
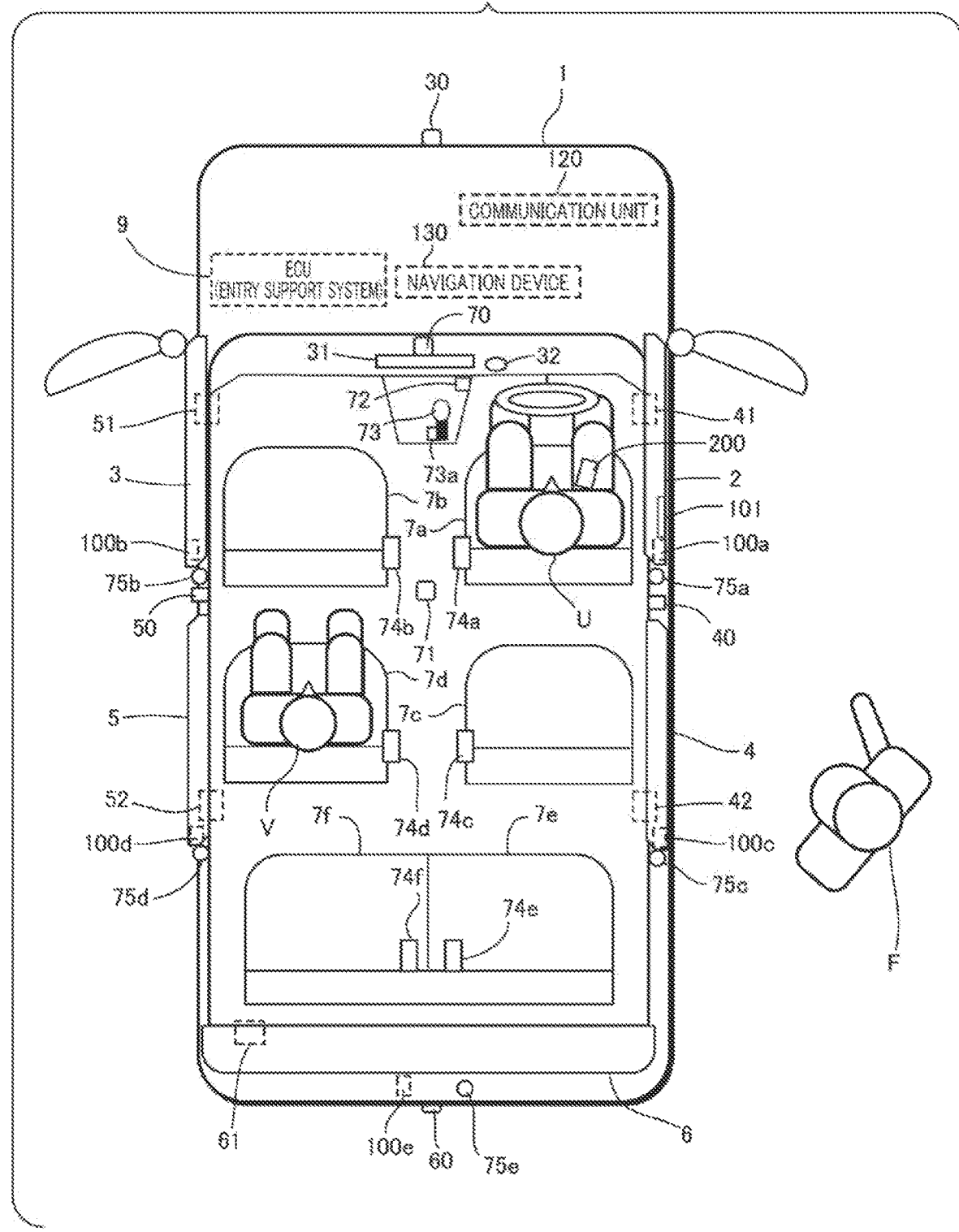
FIG. 2 is a block diagram of the vehicle loaded with the entry support system.

With reference to FIG. 2, the configuration of the vehicle 1 loaded with the ECU 9 including the function of the entry support system will be explained. The vehicle 1 is a passenger car with a riding capacity of six people, and includes a driver's seat 7a, a passenger seat 7b, a second row right seat 7c, a second row left seat 7d, a third row right seat 7e, and a third row left seat 7f. The individual seats 7a-7f are provided with seatbelt switches 74a-74f which detect whether or not non-illustrated seatbelts are worn. Hereinafter, the second row right seat 7c and the second row left seat 7d are also referred to as second row seats together, and the third row right seat 7e and the third row left seat 7f are also referred to as third row seats together. The registered user U is sitting in the driver's seat 7a, and the unregistered user V is sitting in the second row left seat 7d.

The vehicle 1 includes a right power hinge door 2, a left power hinge door 3, a right power slide door 4, a left power slide door 5, and a power tail gate 6. Hereinafter, the right power hinge door 2, the left power hinge door 3, the right power slide door 4 and the left power slide door 5 are also referred to as power doors. The right power slide door 4 and the left power slide door 5 are the power doors corresponding to the second row seats and the third row seats.

A door knob of the right power hinge door 2 is provided with a door touch sensor 101, and the registered user U or the like who has a portable key (not illustrated) of the vehicle 1 can unlock the doors 2-6 of the vehicle 1 by touching the door touch sensor 101.

The right power hinge door 2 includes a right PHD (Power Hinge Door) drive unit 41 which opens and closes the right power hinge door 2 by an electric actuator (not illustrated), and the left power hinge door 3 includes a left PHD drive unit 51 which opens and closes the left power hinge door 3 by the electric actuator. The right power slide door 4 includes a right PSD (Power Slide Door) drive unit 42 which opens and closes the right power slide door 4 by the electric actuator, and the left power slide door 5 includes a left PSD drive unit 52 which opens and closes the left power slide door 5 by the electric actuator. The power tail gate 6 includes a PTG (Power Tail Gate) drive unit 61 which opens and closes the power tail gate 6 by the electric actuator.

A front camera 30 which photographs front of the vehicle 1 is provided on a front part of the vehicle 1, and a rear camera 60 which photographs rear of the vehicle 1 is provided on a rear part of the vehicle 1. A right side camera 40 which photographs a right side of the vehicle 1 is provided on a right side part of the vehicle 1, and a left side camera 50 which photographs a left side of the vehicle 1 is provided on a left side part of the vehicle 1. The front camera 30, the right side camera 40, the left side camera 50 and the rear camera 60 are the vehicle exterior cameras that photograph the surroundings of the vehicle 1.

On a dashboard of the vehicle interior, a front seat camera 70 which photographs users sitting in the driver's seat 7a and the passenger seat 7b, a display device 31 and a speaker 32 are provided. On a ceiling of the vehicle interior, rear seat camera 71 which photographs users sitting in the second row right seat 7c, the second row left seat 7d, the third row right seat 7e and the third row left seat 7f is provided.

The individual doors 2-5 are provided with door switches 75a-75d which detect opening/closing of the doors. The power tail gate 6 is also provided with a door switch 75e which detects the opening/closing of the power tail gate 6. Further, near the driver's seat 7a, a power switch 72 for instructing on/off of power of the vehicle 1, and a shift switch 73a which detects a shift position of a shift lever 73 are provided.

Further, the vehicle 1 includes door lock mechanisms 100a-100e which lock the individual doors 2-5 and the power tail gate 6, the communication unit 120 which communicates with the user terminal 200 and the user information server 300 or the like, and the navigation device 130. The navigation device 130 has a non-illustrated processor, GPS (Global Positioning System) sensor, memory, and map data, and executes route guidance, by a function of the processor, to a destination or the like based on a position of the predetermined vehicle 1 detected by the GPS sensor and the map data.

3. Configuration of Entry Support System

Figure 3:
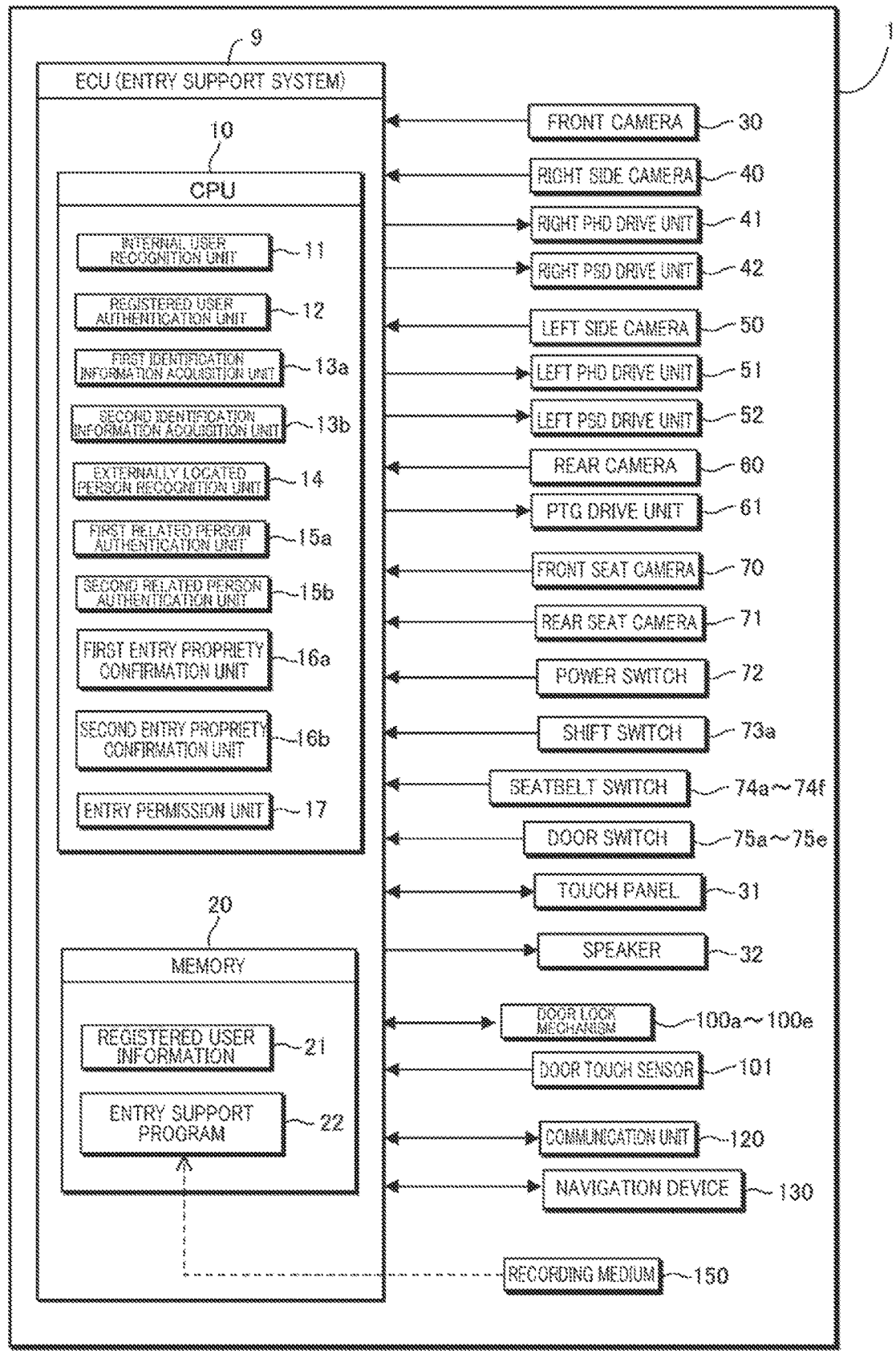
FIG. 3 is a block diagram of the entry support system.

With reference to FIG. 3, the entry support system configured as the function of the ECU 9 will be explained. The ECU 9 is configured by a CPU (Central Processing Unit) 10, a memory 20 and a non-illustrated interface circuit or the like, and controls an operation of the vehicle 1. The CPU 10 corresponds to a computer of the present invention. In the memory 20, registered user information 21 including identification information of the registered user riding on the vehicle 1 and an entry support program 22 are preserved.

The entry support program 22 may be read from a recording medium 150 (such as an optical disk or a flash memory) and preserved in the memory 20 by the ECU 9. In addition, the entry support program 22 may be downloaded from a non-illustrated external server via the communication network 500 and preserved in the memory 20 by the ECU 9.

To the ECU 9, images of the surroundings of the vehicle 1 photographed by the front camera 30, the right side camera 40, the left side camera 50 and the rear camera 60 are inputted. In addition, to the ECU 9, the images inside the vehicle interior photographed by the front seat camera 70 and the rear seat camera 71 are inputted.

Further, to the ECU 9, detection signals of the power switch 72, the shift switch 73a, the seatbelt switches 74a-74f and the door switches 75a-75e, and lock detection signals of the individual doors 2-5 and the power tail gate 6 by door lock sensors (not illustrated) provided in the door lock mechanisms 100a-100e are inputted. In addition, to the ECU 9, an operation signal of the touch panel 31, a touch detection signal by the door touch sensor 101, and information on a current position of the vehicle 1 detected by the navigation device 130 are inputted.

By a control signal outputted from the ECU 9, the operations of the right PHD drive unit 41, the right PSD drive unit 42, the left PHD drive unit 51, the left PSD drive unit 52, the PTG drive unit 61 and the door lock mechanisms 100a-100e are controlled. In addition, by the control signal outputted from the ECU 9, screen display of the touch panel 31 and sound (such as voice guidance or chime sound) outputted from the speaker 32 are controlled. The ECU 9 communicates with the user terminal 200, the user information server 300 and the entry support server 400 illustrated in FIG. 1 (see FIG. 1) or the like via the communication unit 120.

By reading and executing the entry support program 22 preserved in the memory 20, the CPU 10 functions as an internal user recognition unit 11, a registered user authentication unit 12, a first identification information acquisition unit 13a, a second identification information acquisition unit 13b, an externally located person recognition unit 14, a first related person authentication unit 15a, a second related person authentication unit 15b, a first entry propriety confirmation unit 16a, a second entry propriety confirmation unit 16b, and an entry permission unit 17.

The processing executed by the internal user recognition unit 11 corresponds to an internal user recognition step in an entry support method of the present invention, and the processing executed by the registered user authentication unit 12 corresponds to a registered user authentication step in the entry support method of the present invention. The processing executed by the first identification information acquisition unit 13a corresponds to a first identification information acquisition step in the entry support method of the present invention, and the processing executed by the externally located person recognition unit 14 corresponds to an externally located person recognition step in the entry support method of the present invention. The processing executed by the first related person authentication unit 15a corresponds to a first related person authentication step of the present invention, and the processing executed by the entry permission unit 17 corresponds to an entry permission step of the present invention.

The internal user recognition unit 11 recognizes the internal user located inside the interior of the vehicle 1 by extracting an image portion having a feature of a person from the photographed images by the front seat camera 70 and the rear seat camera 71. The registered user authentication unit 12 determines whether the internal user recognized by the internal user recognition unit 11 is the registered user or the unregistered user. The registered user authentication unit 12 determines that the internal user is the registered user when a matching degree between the image portion of the internal user and the face image of the registered user recorded in the registered user information 21 is a first determination value or greater. In an example of FIGS. 1 and 2, the internal user U is determined as the registered user, and the internal user V is determined as the unregistered user.

The first identification information acquisition unit 13a refers to the first user DB 310, and acquires the first identification information Rg1 which is the identification information of the first related person in the first predetermined relation with the registered user U. The second identification information acquisition unit 13b refers to the second user DB 320, and acquires the second identification information Rg2 which is the identification information of the second related person in the second predetermined relation with the unregistered user V. In the present embodiment, the first identification information Rg1 is the face image of the first related person, and the second identification information Rg2 is the face image of the second related person.

The externally located person recognition unit 14 recognizes the externally located person located near the vehicle 1 by extracting the image portion having the feature of a person from the images of the surroundings of the vehicle 1 photographed by the front camera 30, the right side camera 40, the left side camera 50 and the rear camera 60.

The first related person authentication unit 15a determines whether or not the externally located person is the first related person based on the first identification information Rg1 (the face image of the first related person). The first related person authentication unit 15a determines that the externally located person is the first related person in the case where the matching degree between the image of the externally located person and the face image of the first related person is a second determination value or greater.

The second related person authentication unit 15b determines whether or not the externally located person is the second related person based on the second identification information Rg2 (the face image of the second related person). The second related person authentication unit 15b determines that the externally located person is the second related person in the case where the matching degree between the image of the externally located person and the face image of the second related person is a third determination value or greater.

The first entry propriety confirmation unit 16a performs the processing of coping with the case where a plurality of externally located persons are recognized by the externally located person recognition unit 14 and the first related person and a person other than the first related person are included in the plurality of externally located persons in the state where it is determined that the internal user riding on the vehicle 1 is the registered user by the registered user authentication unit 12.

That is, in this case, the first entry propriety confirmation unit 16a transmits first entry propriety confirmation information confirming whether or not to permit the entry to the vehicle 1 to the touch panel 31 and the user terminal 200. The first entry propriety confirmation information includes the face image of the person other than the first related person. The registered user U visually recognizes the face image of the person other than the first related person on an entry propriety confirmation screen displayed at a display unit of the touch panel 31 and the user terminal 200, and performs an entry permission operation in the case of permitting the entry to the vehicle 1. According to the entry permission operation, the touch panel 31 or the user terminal 200 transmits the first entry permission information to the ECU 9.

Note that the first entry propriety confirmation unit 16a may transmit the first entry propriety confirmation information to only one of the touch panel 31 and the user terminal 200.

The second entry propriety confirmation unit 16b performs the processing of coping with the case where it is determined that the externally located person is the second related person by the second related person authentication unit 15b in the state where it is determined that the internal user riding on the vehicle 1 is not the registered user (is the unregistered user) by the registered user authentication unit 12.

That is, in this case, the second entry propriety confirmation unit 16b transmits second entry propriety confirmation information confirming whether or not to permit the entry to the vehicle 1 to the user terminal 200. The second entry propriety confirmation information includes the image of the second related person. The registered user U visually recognizes the entry propriety confirmation screen including the image of the second related person, the screen being displayed at the display unit of the user terminal 200, and performs the entry permission operation in the case of permitting the entry to the vehicle 1. According to the entry permission operation, the user terminal 200 transmits the second entry permission information to the ECU 9.

Note that, when the registered user and the unregistered user are riding on the vehicle 1, the second entry propriety confirmation unit 16b may transmit the second entry propriety confirmation information not to the user terminal 200 but to the touch panel 31, or to the touch panel 31 as well as the user terminal 200. The touch panel 31 which receives the second entry propriety confirmation information displays the entry propriety confirmation screen including the image of the second related person. Then, when a touch operation for entry permission by the registered user U is detected, the second entry propriety confirmation unit 16b transmits the second entry permission information to the ECU 9.

The entry permission unit 17 executes the entry permission processing of opening the power door of the vehicle 1 and permitting the entry to the vehicle 1 in the case where one of a first entry condition-a third entry condition below is established.

First entry condition . . . . The registered user is riding on the vehicle 1 and the externally located person is the first related person only.

Second entry condition . . . . The registered user is riding on the vehicle 1, the externally located persons are the first related person and an unconfirmable person other than the first related person, and the ECU 9 receives the first entry permission information from the user terminal 200 or the touch panel 31.

Third entry condition . . . . The unregistered user is riding on the vehicle 1, the externally located person is the second related person only, and the ECU 9 receives the second entry permission information from the user terminal 200 or the touch panel 31.

Note that, when the unregistered user is riding on the vehicle 1 and the externally located persons are the second related person and the unconfirmable person other than the second related person, the entry to the vehicle 1 may be prohibited, or the entry to the vehicle 1 may be permitted subject to the reception of the second entry permission information similarly to the third entry condition.

4. Entry Support Processing

With reference to FIGS. 1 to 3, the entry support processing for the vehicle 1 executed by the function of the ECU 9 as the entry support system will be explained according to flowcharts illustrated in FIGS. 4 to 7.

Figure 4:
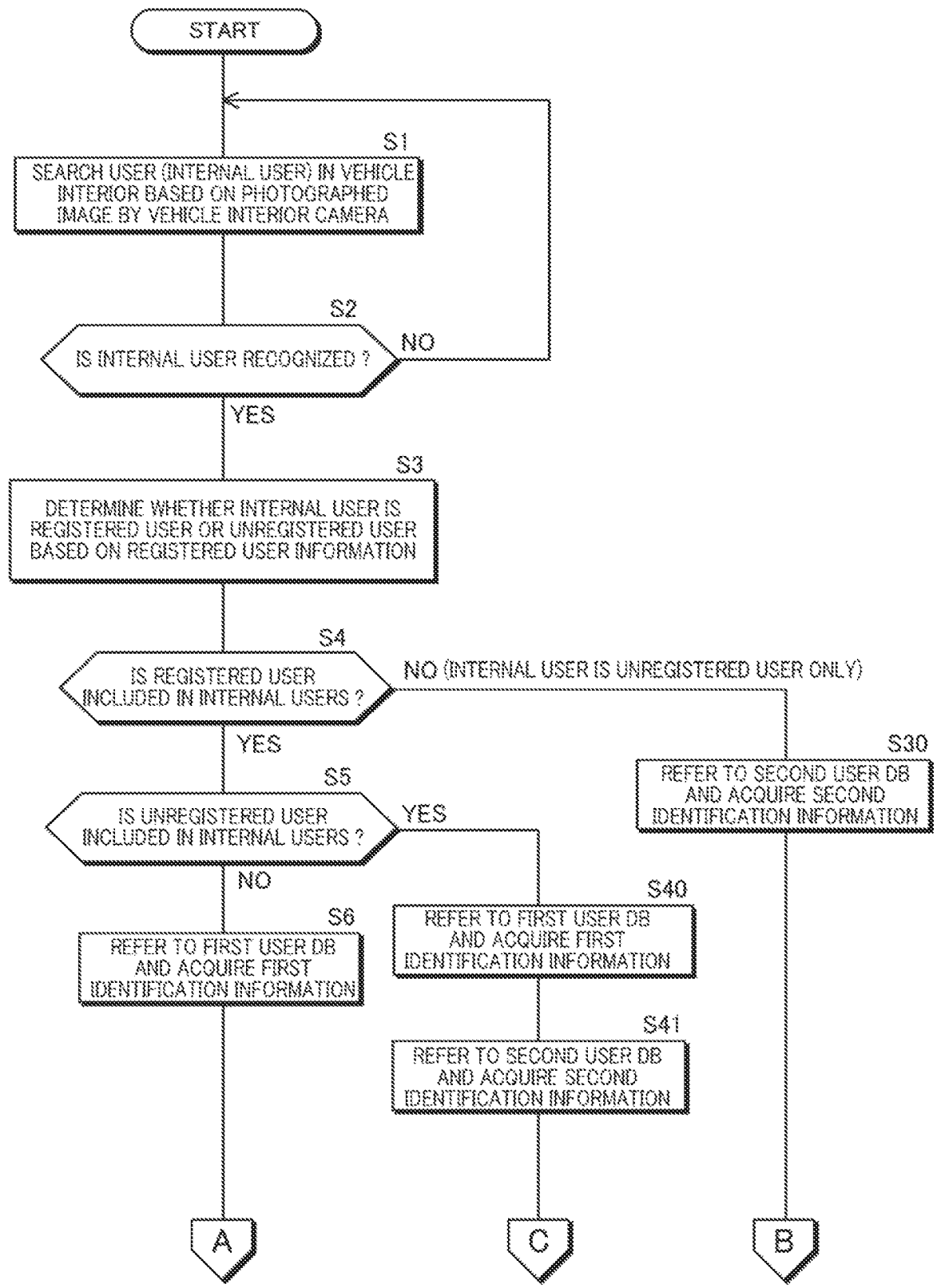
FIG. 4 is a first flowchart of entry support processing.

In step S1 in FIG. 4, the internal user recognition unit 11 searches a user (internal user) inside the interior of the vehicle 1 based on the photographed images by vehicle interior cameras (the front seat camera 70 and the rear seat camera 71). In following step S2, the internal user recognition unit 11 advances the processing to step S3 when the internal user is recognized, and advances the processing to step S1 when the internal user is not recognized. In the example of FIG. 1 and FIG. 3, the internal users U and V are recognized.

In next step S3, the registered user authentication unit 12 determines whether or not the internal user is the registered user based on the identification information of the registered user (the face image of the registered user) recorded in the registered user information 21 preserved in the memory 20. In the example of FIG. 1 and FIG. 3, the internal user U is determined as the registered user and the internal user V is determined as not the registered user (as the unregistered user).

In step S4, the registered user authentication unit 12 determines whether or not the registered user is included in the internal users, advances the processing to step S5 when the registered user is included in the internal users, and advances the processing to step S30 when the registered user is not included in the internal users (when the internal users are the unregistered users only). In step S5, the registered user authentication unit 12 determines whether or not the unregistered user is included in the internal users, advances the processing to step S40 when the unregistered user is included, and advances the processing to step S6 when the unregistered user is not included.

Figure 5:
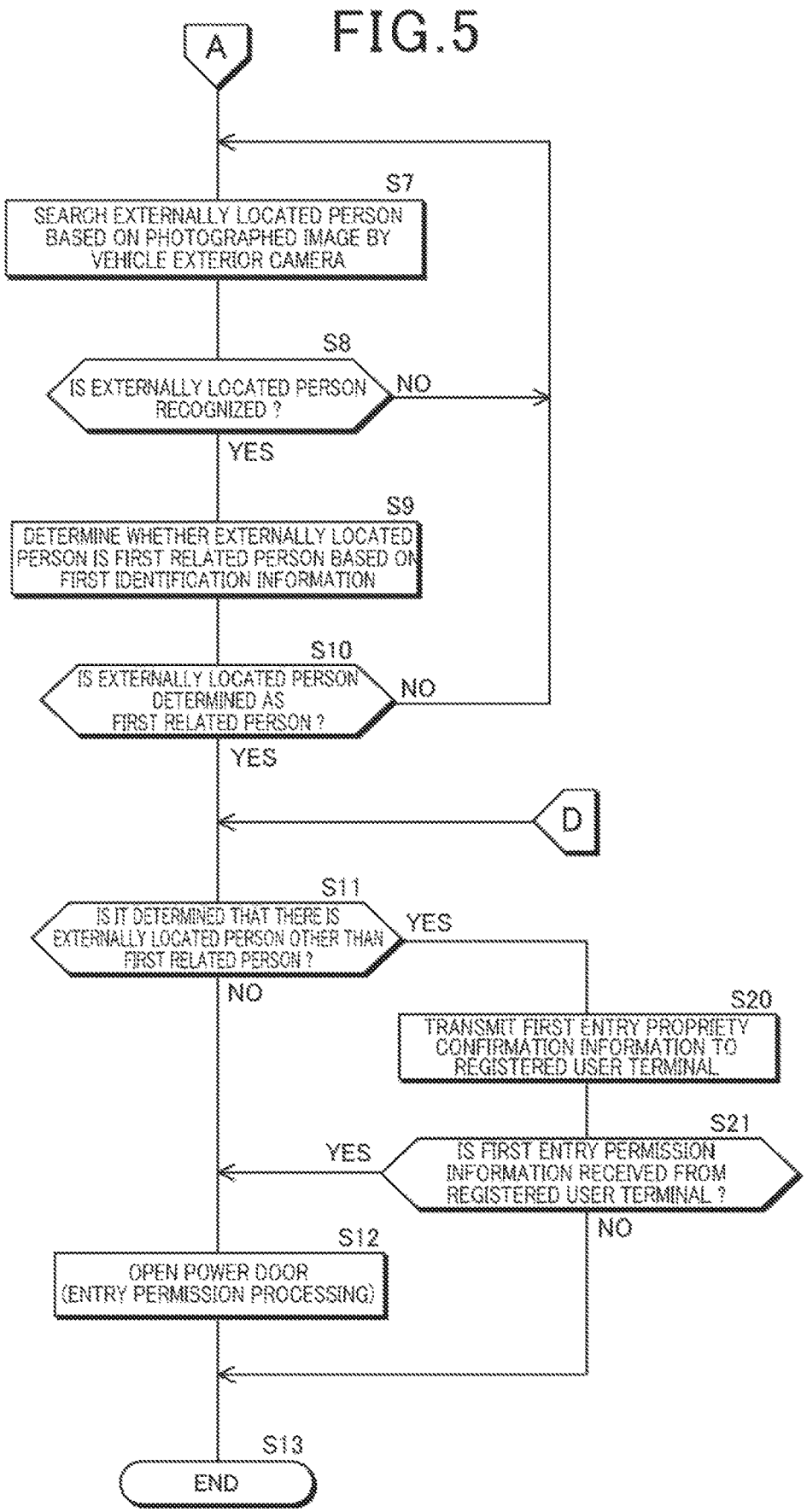
FIG. 5 is a second flowchart of the entry support processing.

Step S6-step S10 in FIG. 5 are the processing when the internal users are the registered users only. In step S6, the first identification information acquisition unit 13a refers to the first user DB 310, and acquires the first identification information Rg1 (see FIG. 1) of the first related person in the first predetermined relation with the registered user.

In following step S7 in FIG. 5, the externally located person recognition unit 14 searches the externally located person located near the vehicle 1 based on the photographed images by the vehicle exterior cameras (the front camera 30, the right side camera 40, the left side camera 50 and the rear camera 60). In next step S8, the externally located person recognition unit 14 advances the processing to step S9 when the externally located person is recognized, and advances the processing to step S7 when the externally located person is not recognized. In the example of FIG. 1, the externally located persons F and P are recognized.

In following step S9, the first related person authentication unit 15*a* determines whether or not the externally located person is the first related person based on the first identification information Rg1. Then, the first related person authentication unit 15*a* advances the processing to step S11 when it is determined that the externally located person is the first related person, and advances the processing to step S7 when it is determined that the externally located person is not the first related person.

In step S11, the first entry propriety confirmation unit 16*a* determines whether or not there is the externally located person (unconfirmable outsider) other than the first related person. Then, when there is no unconfirmable outsider, the first entry propriety confirmation unit 16*a* advances the processing to step S12, and executes the entry permission processing of opening the power door of the vehicle 1 to enable the entry of the externally located person to the vehicle 1. In this case, in the example of FIG. 2, the right power slide door 4 corresponding to the vacant second row right seat 7*c*, or the left power hinge door 3 corresponding to the vacant passenger seat 7*b* may be opened.

On the other hand, when there are the first related person and the unconfirmable person, the first entry propriety confirmation unit 16*a* advances the processing to step S20, and transmits the first entry propriety confirmation information including the face image of the unconfirmable outsider to the user terminal 200 and the touch panel 31. In following step S21, the entry permission unit 17 advances the processing to step S12 when the first entry permission information is received from the registered user terminal. Thus, in the case where, of the externally located persons F and P, the externally located person F is the first related person and the externally located person P is the unconfirmable outsider as illustrated in FIG. 1, the entry to the vehicle 1 can be permitted subject to the instruction of the registered user.

In addition, when the first entry permission information is not received from the registered user terminal, the entry permission unit 17 advances the processing from step S21 to step S13, and in this case, the entry of the externally located person to the vehicle 1 is prohibited.

Figure 6:
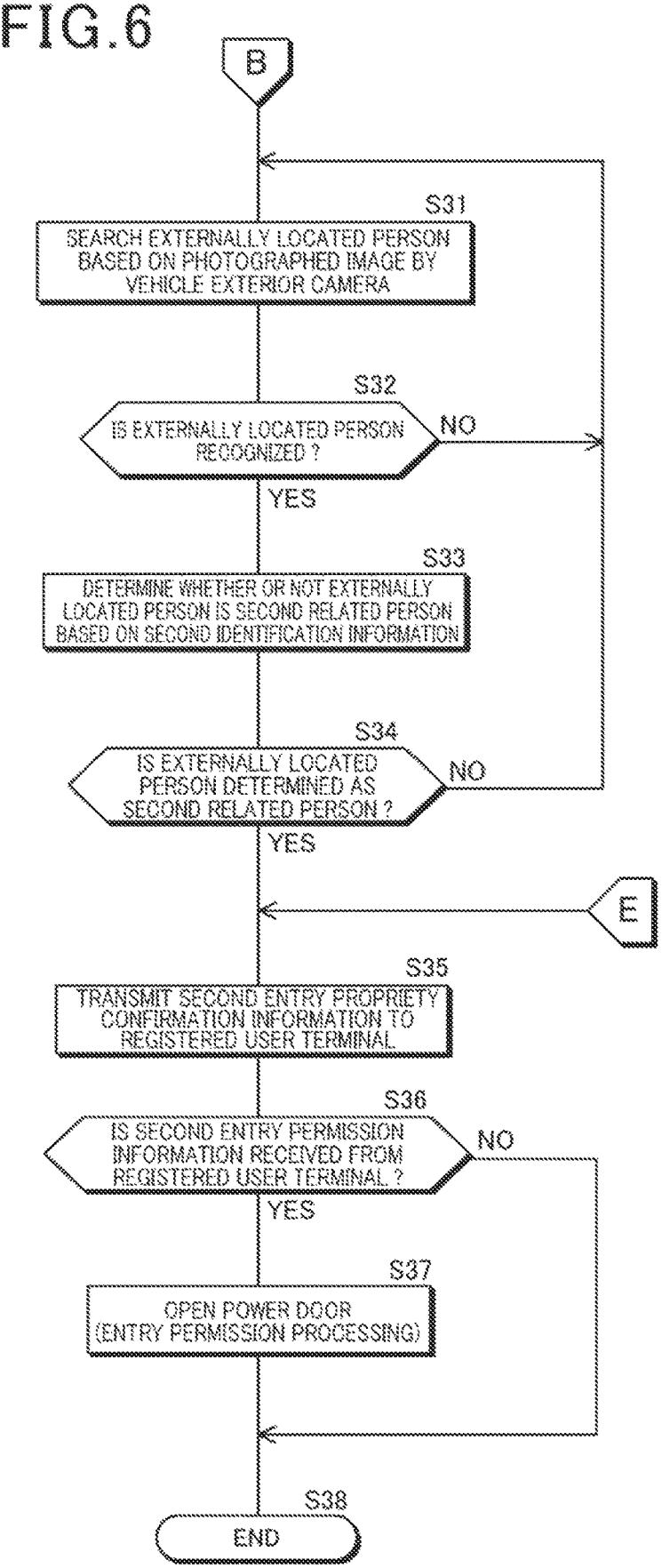
FIG. 6 is a third flowchart of the entry support processing.

Next, step S30-step S34 in FIG. 6 are the processing when the internal user is the unregistered user only. In step S30, the second identification information acquisition unit 13*b* refers to the second user DB 320, and acquires the second identification information Rg2 (see FIG. 1) of the second related person in the second predetermined relation with the unregistered user.

In following step S31 in FIG. 6, the externally located person recognition unit 14 searches the externally located person located near the vehicle 1 based on the photographed images by the vehicle exterior cameras (the front camera 30, the right side camera 40, the left side camera 50 and the rear camera 60). In next step S32, the externally located person recognition unit 14 advances the processing to step S33 when the externally located person is recognized, and advances the processing to step S31 when the externally located person is not recognized. In the example of FIG. 1, the externally located persons F and P are recognized.

In following step S33, the second related person authentication unit 15*b* determines whether or not the externally located person is the second related person based on the second identification information Rg2. Then, the second related person authentication unit 15*b* advances the processing to step S35 when the externally located person is determined as the second related person, and advances the processing to step S31 when the externally located person is determined as not the second related person.

In step S35, the second entry propriety confirmation unit 16*b* transmits the second entry propriety confirmation information including the face image of the second related person to the user terminal 200. At the user terminal 200 which receives the second entry propriety confirmation information, entry confirmation including the face image of the second related person is displayed. Then, according to the entry permission operation by the registered user who has visually recognized an entry confirmation screen, the second entry permission information is transmitted from the user terminal 200 to the ECU 9.

In step S36, the entry permission unit 17 determines whether or not the second entry permission information is received from the user terminal 200. Then, when the second entry permission information is received, the entry permission unit 17 advances the processing to step S37, and executes the processing of opening the power door similarly to step S12 described above.

On the other hand, when the second entry permission information is not received from the user terminal 200, the entry permission unit 17 advances the processing to step S38, and in this case, the entry of the externally located person to the vehicle 1 is prohibited.

Figure 7:
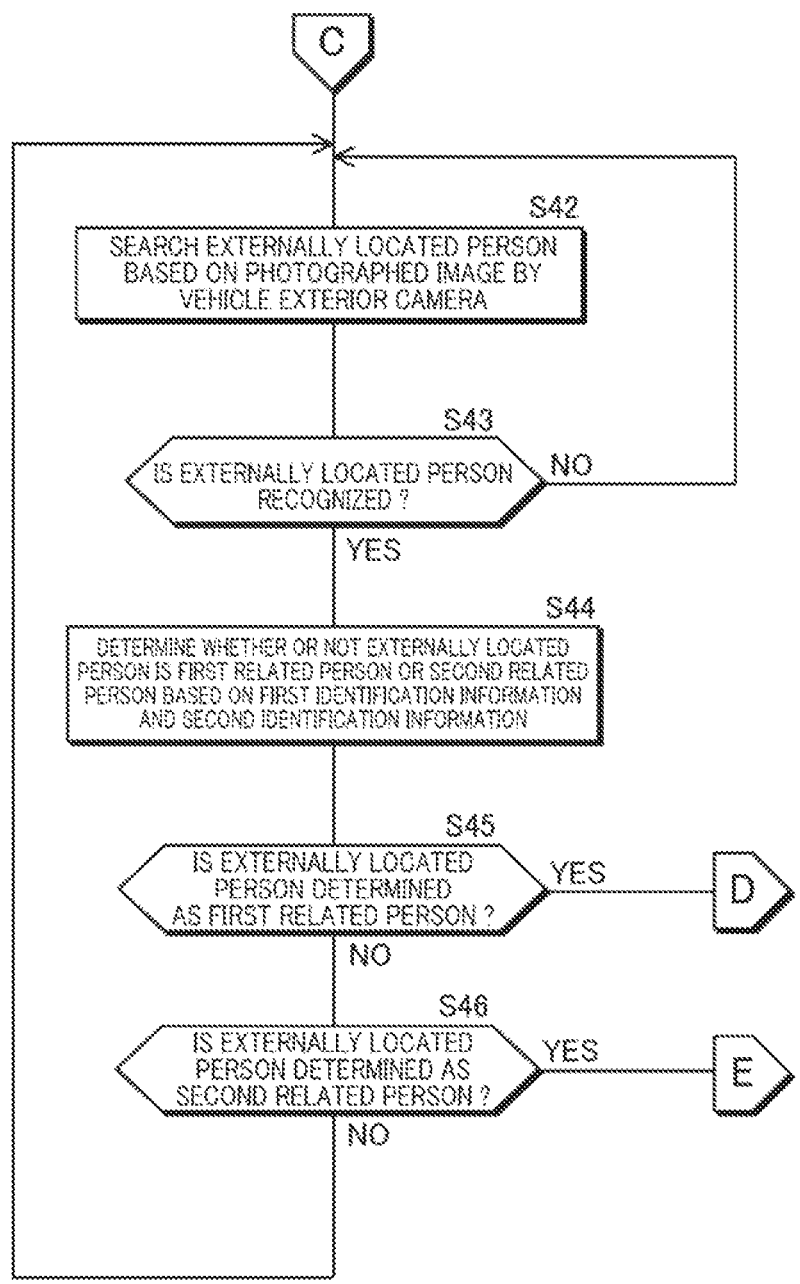
FIG. 7 is a fourth flowchart of the entry support processing.

Next, step S40 in FIG. 4-step S46 in FIG. 7 are the processing when the registered user and the unregistered user are included in the internal users. In step S40, the first identification information acquisition unit 13*a* refers to the first user DB 310, and acquires the first identification information Rg1 of the first related person in the first predetermined relation with the registered user. In next step S41, the second identification information acquisition unit 13*b* refers to the second user DB 320, and acquires the second identification information Rg2 of the second related person in the second predetermined relation with the unregistered user.

In following step S42 in FIG. 7, the externally located person recognition unit 14 searches the externally located person located near the vehicle 1 based on the photographed images by the vehicle exterior cameras. In next step S43, the externally located person recognition unit 14 advances the processing to step S44 when the externally located person is recognized, and advances the processing to step S42 when the externally located person is not recognized. In the example of FIG. 1, the externally located persons F and P are recognized.

In following step S44, the first related person authentication unit 15*a* determines whether or not the externally located person is the first related person based on the first identification information Rg1. In addition, the second related person authentication unit 15*b* determines whether or not the externally located person is the second related person based on the second identification information Rg2. Then, in next step S45, the first related person authentication unit 15*a* advances the processing to step S11 in FIG. 5 when the externally located person is determined as the first related person, and advances the processing to step S46 when the externally located person is determined as not the first related person.

In step S46, the second related person authentication unit 15b advances the processing to step S35 in FIG. 6 when the externally located person is determined as the second related person, and advances the processing to step S42 when the externally located person is determined as not the second related person.

5. Other Embodiments

In the embodiment described above, as the first related person in the first predetermined relation with the registered user, a family member or a friend or the like of the registered user is illustrated, however, in the case where the registered user requests a predetermined service to the vehicle (delivery to the vehicle, for example), a person in charge of the service who provides the predetermined service may be included in the first related person.

In the embodiment described above, the entry support system includes the second identification information acquisition unit 13b, the second related person authentication unit 15b and the second entry propriety confirmation unit 16b, and performs the processing of permitting the entry to the vehicle 1 for the second related person in the second predetermined relation with the unregistered user riding on the vehicle 1. As another embodiment, the processing of permitting the entry to the vehicle 1 may not be performed for the second related person.

In the embodiment described above, the first entry propriety confirmation unit 16a is provided, and the first entry propriety confirmation information is transmitted to the registered user terminal (the user terminal 200 and the touch panel 31) when the first related person in the first predetermined relation with the registered user riding on the vehicle 1 and the person (unconfirmable outsider) other than the first related person are recognized as the externally located persons. As another embodiment, the first entry propriety confirmation unit 16a may be omitted.

In the embodiment described above, the entry support system of the present invention is configured by the ECU 9 loaded on the vehicle 1. As another embodiment, the entry support system may be configured by the entry support server 400 illustrated in FIG. 1. In this case, from the vehicle 1 to the entry support server 400, the photographed images of the vehicle interior cameras (the front seat camera 70 and the rear seat camera 71) and the vehicle exterior cameras (the front camera 30, the right side camera 40, the left side camera 50 and the rear camera 60) are transmitted. In addition, from the entry support server 400 to the vehicle 1, control information which opens the power door of the vehicle 1 is transmitted.

Further, a part of the configuration of the entry support system may be configured by the ECU 9 of the vehicle 1, and the remaining configuration of the entry support system may be configured by the entry support server 400. In this case, the entry support system is configured by the ECU 9 and the entry support server.

In addition, the entry support system of the present invention may be configured by an application of the user terminal 200. In this case, the entry support method of the present invention is executed by a CPU (not illustrated) of the user terminal 200, the photographed images of the vehicle exterior cameras and the vehicle interior cameras are transmitted from the vehicle 1 to the user terminal 200, and the control information which opens the power door of the vehicle 1 is transmitted from the user terminal 200 to the vehicle 1.

Further, a part of the configuration of the entry support system may be configured by the application of the user terminal 200, and the remaining configuration of the entry support system may be configured by the ECU 9 or the entry support server 400. In this case, the entry support system is configured by the user terminal 200 and the ECU 9, or by the user terminal 200, the ECU 9 and the entry support server 400.

In the embodiment described above, the entry permission unit 17 performs the processing of opening the power door of the vehicle 1 as the entry permission processing for enabling the entry to the vehicle 1, however, the processing of unlocking the power door may be performed as the entry permission processing. In addition, the processing of unlocking a door may be performed as the entry permission processing for a vehicle not provided with the power door.

In the embodiment described above, the face images are used as the identification information for authenticating the registered user, the first related person and the second related person, however, other biological information of an iris, a voiceprint or the like may be used as the identification information. Or, identification codes transmitted from portable terminals carried by the registered user, the first related person and the second related person may be used as the identification information.

Figure 8:
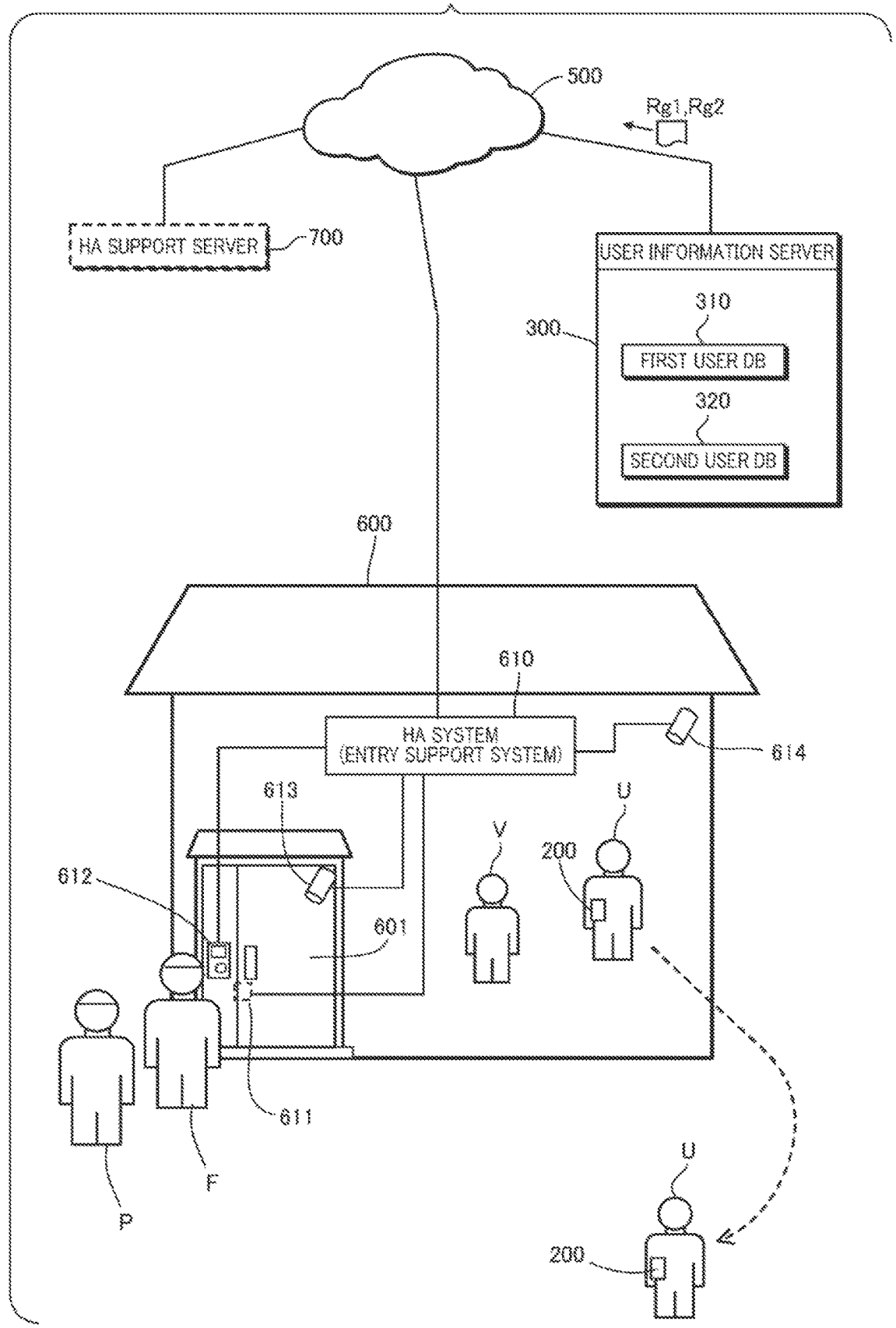
FIG. 8 is an explanatory drawing of a support aspect of entry to a building by the entry support system.

In the embodiment described above, the vehicle 1 is illustrated as the closed space provided with the entrance, however, the present invention is applicable to the entry to the closed space other than the vehicle. FIG. 8 illustrates an example of supporting the entry to a building 600 provided with a door (entrance) 601. The building may be a general house or an accommodation facility.

FIG. 8 illustrates the case of configuring the entry support system as a function of an HA (Home Automation) system 610 provided in the building 600. To the HA system 610, a lock mechanism 611 of the door 601, an interphone 612, an outdoor camera 613, and an indoor camera 614 are connected.

The configuration of the entry support system in the HA system 610 is similar to the configuration of the entry support system in the ECU 9 illustrated in FIG. 3. The vehicle interior cameras described in FIGS. 4 to 7 correspond to the indoor camera 614, and the vehicle exterior cameras correspond to the outdoor camera 613 and a built-in camera of the interphone 612. The HA system 610 supports the entry to the building 600 for the externally located persons F and P located near the building 600 by the processing similar to FIGS. 4 to 7.

The HA system 610 determines whether or not the internal users U and V located inside the building 600 are the registered users from the photographed image of the indoor camera 614. Then, when the internal user U is the registered user and the internal user V is the unregistered user, the HA system 610 acquires the first identification information Rg1 of the first related person in the first predetermined relation with the registered user U from the first user DB 310, and acquires second identification information Rg2 of the second related person in the second predetermined relation with the unregistered user V from the second user DB 320.

When the externally located persons F and P are recognized from the photographed image of the outdoor camera 613 or the built-in camera of the interphone 612, the HA system 610 determines whether or not the externally located persons F and P are the first related person or the second related person based on the first identification information Rg1 and the second identification information Rg2. Then, the HA system 610 performs the processing of unlocking a lock of the door 601 by the lock mechanism 611 as the processing for enabling the entry to the building 600 according to a determination result.

Note that FIGS. 1 to 3 are schematic diagrams illustrating the configuration of the vehicle 1 and the ECU 9 including the function of the entry support system in divisions depending on main processing content to facilitate understanding of the present invention, but the configuration of the vehicle 1 and the entry support system may be configured by other divisions. In addition, the processing of each component may be executed by one hardware unit, or may be executed by a plurality of hardware units. Further, the processing by each component illustrated in FIGS. 4 to 7 may be executed by one program, or may be executed by a plurality of programs.

6. Configuration Supported by Embodiment Described Above

The embodiment described above is a specific example of the configuration below.

(Clause 1) An entry support system which supports entry of an externally located person to a closed space provided with an entrance, the entry support system including: an internal user recognition unit configured to recognize an internal user located inside the closed space; a registered user authentication unit configured to determine whether the internal user is a registered user for whom predetermined registration is performed or an unregistered user for whom the predetermined registration is not performed; a first identification information acquisition unit configured to refer to a first user database in which information of the registered user is recorded, and acquire first identification information which is identification information of a first related person in a first predetermined relation with the registered user; an externally located person recognition unit configured to recognize the externally located person located in an area around the closed space; a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and an entry permission unit configured to execute entry permission processing for enabling the entry of the externally located person to the closed space from the entrance when the externally located person is determined as the first related person by the first related person authentication unit.

According to the entry support system of Clause 1, in the case where an unregistered externally located person approaches a closed space in the state where a registered user is located inside the closed space, when the externally located person is determined as a first related person in a first predetermined relation with the registered user by the first related person authentication unit, the entry permission processing for enabling entry of the externally located person from an entrance is executed by the entry permission unit. Thus, the entry to the closed space by the unregistered externally located person can be facilitated.

(Clause 2) The entry support system according to Clause 1, including a first entry propriety confirmation unit configured to transmit first entry propriety confirmation information confirming propriety of the entry of a plurality of the externally located persons to a registered user terminal used by the registered user, when the plurality of externally located persons are recognized by the externally located person recognition unit and at least one of the plurality of externally located persons is determined as not the first related person by the first related person authentication unit, wherein the entry permission unit executes the entry permission processing when first entry permission information instructing permission of the entry of the plurality of externally located persons is received in response to reception of the first entry propriety confirmation information from the registered user terminal.

According to the entry support system of Clause 2, in the case where a person not in the first predetermined relation with the registered user is included in the plurality of externally located persons, the entry permission processing can be executed subject to confirmation to the registered user.

(Clause 3) The entry support system according to Cause 1 or Clause 2, including: a second identification information acquisition unit configured to refer to a second user database in which information of the unregistered user is recorded and acquire second identification information which is identification information of a second related person in a second predetermined relation with the unregistered user; a second related person authentication unit configured to determine whether or not the externally located person is the second related person based on the second identification information when the externally located person is recognized by the externally located person recognition unit in the state where the internal user determined as the unregistered user by the registered user authentication unit is recognized by the internal user recognition unit; and a second entry propriety confirmation unit configured to transmit second entry propriety confirmation information confirming the propriety of the entry of the externally located person to the registered user terminal used by the registered user when the externally located person is determined as the second related person by the second related person authentication unit, wherein the entry permission unit executes the entry permission processing when second entry permission information instructing permission of the entry of the externally located person is received in response to reception of the second entry propriety confirmation information from the registered user terminal.

According to the entry support system described in Clause 3, in the case where the unregistered internal user is already located inside the closed space, the entry permission processing can be executed subject to the confirmation to the registered user for the externally located person in the second predetermined relation with the internal user.

(Clause 4) The entry support system according to any one of Clauses 1 to 3, wherein the closed space is an interior of a vehicle, the entrance is a door of the vehicle, the predetermined registration is user registration of the vehicle, and the entry permission unit executes processing of unlocking the door of the vehicle as the entry permission processing.

According to the entry support system of Clause 4, in the case where the registered user or the unregistered user is riding on the vehicle, the entry to the vehicle interior can be facilitated for the first related person in the first predetermined relation with the registered user or the second related person in the second predetermined relation with the unregistered user.

(Clause 5) An entry support method executed by a computer in order to support entry of an externally located person to a closed space provided with an entrance, the entry support method including: an internal user recognition step of recognizing an internal user located inside the closed space; a registered user authentication step of determining whether the internal user is a registered user for whom predetermined registration is performed or an unregistered user for whom the predetermined registration is not performed; a first identification information acquisition step of referring to a first user database in which information of the registered user is recorded, and acquiring first identification information which is identification information of a first related person in a first predetermined relation with the registered user; an externally located person recognition step of recognizing the externally located person located in an area around the closed space; a first related person authentication step of determining whether or not the externally located person is the first related person based on the first identification information when the externally located person is recognized by the externally located person recognition step in a state where the internal user determined as the registered user by the registered user authentication step is recognized by the internal user recognition step; and an entry permission step of executing entry permission processing for enabling the entry of the externally located person to the closed space from the entrance when the externally located person is determined as the first related person by the first related person authentication step.

By executing the entry support method of Clause 5 by the computer, an operation effect similar to that of the entry support system of Clause 1 can be obtained.

(Clause 6) A non-transitory computer-readable storage medium storing an entry support program which is executed by a processor of an entry support system for supporting entry of an externally located person to a closed space provided with an entrance, wherein the entry support program makes the processor functions as: an internal user recognition unit configured to recognize an internal user located inside the closed space; a registered user authentication unit configured to determine whether the internal user is a registered user for whom predetermined registration is performed or an unregistered user for whom the predetermined registration is not performed; a first identification information acquisition unit configured to refer to a first user database in which information of the registered user is recorded, and acquire first identification information which is identification information of a first related person in a first predetermined relation with the registered user; an externally located person recognition unit configured to recognize the externally located person located in an area around the closed space; a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and an entry permission unit configured to execute entry permission processing for enabling the entry of the externally located person to the closed space from the entrance when the externally located person is determined as the first related person by the first related person authentication unit.

By executing the entry support program of Clause 6 by the computer, the configuration of the entry support system of Clause 1 can be achieved.

REFERENCE SIGNS LIST

1 . . . vehicle, 2 . . . right power hinge door, 3 . . . left power hinge door, 4 . . . right power slide door, 5 . . . left power slide door, 6 . . . power tail gate, 9 . . . ECU (entry support system), 10 . . . CPU, 11 . . . internal user recognition unit, 12 . . . registered user authentication unit, 13a . . . first identification information acquisition unit, 13b . . . second identification information acquisition unit, 14 . . . externally located person recognition unit, 15a . . . first related person authentication unit, 15b . . . second related person authentication unit, 16a . . . first entry propriety confirmation unit, 16b . . . second entry propriety confirmation unit, 17 . . . entry permission unit, 20 . . . memory, 21 . . . registered user information, 22 . . . entry support program, 30 . . . front camera, 31 . . . touch panel, 32 . . . speaker, 40 . . . right side camera, 50 . . . left side camera, 60 . . . rear camera, 70 . . . front seat camera, 71 . . . rear seat camera, 150 . . . recording medium, 300 . . . user information server, 400 . . . entry support server, 500 . . . communication network, U,V . . . internal user, F,P . . . externally located person.

What is claimed is:

1. An entry support system which supports entry of an externally located person to a closed space provided with an entrance, the entry support system comprising:
    an internal user recognition unit configured to recognize an internal user located inside the closed space;
    a registered user authentication unit configured to determine whether the internal user is a registered user for whom predetermined registration is performed or an unregistered user for whom the predetermined registration is not performed;
    a first identification information acquisition unit configured to refer to a first user database in which information of the registered user is recorded, and acquire first identification information which is identification information of a first related person in a first predetermined relation with the registered user;
    an externally located person recognition unit configured to recognize the externally located person located in an area around the closed space;
    a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and
    an entry permission unit configured to execute entry permission processing for enabling the entry of the externally located person to the closed space from the entrance when the externally located person is determined as the first related person by the first related person authentication unit.

2. The entry support system according to claim 1, comprising
    a first entry propriety confirmation unit configured to transmit first entry propriety confirmation information confirming propriety of the entry of a plurality of the externally located persons to a registered user terminal used by the registered user, when the plurality of externally located persons are recognized by the externally located person recognition unit and at least one of the plurality of externally located persons is determined as not the first related person by the first related person authentication unit,
    wherein the entry permission unit executes the entry permission processing when first entry permission information instructing permission of the entry of the plurality of externally located persons is received in response to reception of the first entry propriety confirmation information from the registered user terminal.

3. The entry support system according to claim 1, comprising:
a second identification information acquisition unit configured to refer to a second user database in which information of the unregistered user is recorded and acquire second identification information which is identification information of a second related person in a second predetermined relation with the unregistered user;
a second related person authentication unit configured to determine whether or not the externally located person is the second related person based on the second identification information when the externally located person is recognized by the externally located person recognition unit in the state where the internal user determined as the unregistered user by the registered user authentication unit is recognized by the internal user recognition unit; and
a second entry propriety confirmation unit configured to transmit second entry propriety confirmation information confirming the propriety of the entry of the externally located person to the registered user terminal used by the registered user when the externally located person is determined as the second related person by the second related person authentication unit,
wherein the entry permission unit executes the entry permission processing when second entry permission information instructing permission of the entry of the externally located person is received in response to reception of the second entry propriety confirmation information from the registered user terminal.

4. The entry support system according to claim 1,
wherein the closed space is an interior of a vehicle, the entrance is a door of the vehicle,
the predetermined registration is user registration of the vehicle, and
the entry permission unit executes processing of unlocking the door of the vehicle as the entry permission processing.

5. An entry support method executed by a computer in order to support entry of an externally located person to a closed space provided with an entrance, the entry support method comprising:
an internal user recognition step of recognizing an internal user located inside the closed space;
a registered user authentication step of determining whether the internal user is a registered user for whom predetermined registration is performed or an unregistered user for whom the predetermined registration is not performed;
a first identification information acquisition step of referring to a first user database in which information of the registered user is recorded, and acquiring first identification information which is identification information of a first related person in a first predetermined relation with the registered user;
an externally located person recognition step of recognizing the externally located person located in an area around the closed space;
a first related person authentication step of determining whether or not the externally located person is the first related person based on the first identification information when the externally located person is recognized by the externally located person recognition step in a state where the internal user determined as the registered user by the registered user authentication step is recognized by the internal user recognition step; and
an entry permission step of executing entry permission processing for enabling the entry of the externally located person to the closed space from the entrance when the externally located person is determined as the first related person by the first related person authentication step.

6. A non-transitory computer-readable storage medium storing an entry support program which is executed by a processor of an entry support system for supporting entry of an externally located person to a closed space provided with an entrance, wherein the entry support program makes the processor functions as:
an internal user recognition unit configured to recognize an internal user located inside the closed space;
a registered user authentication unit configured to determine whether the internal user is a registered user for whom predetermined registration is performed or an unregistered user for whom the predetermined registration is not performed;
a first identification information acquisition unit configured to refer to a first user database in which information of the registered user is recorded, and acquire first identification information which is identification information of a first related person in a first predetermined relation with the registered user;
an externally located person recognition unit configured to recognize the externally located person located in an area around the closed space;
a first related person authentication unit configured to determine whether or not the externally located person is the first related person based on the first identification information when the externally located person is recognized by the externally located person recognition unit in a state where the internal user determined as the registered user by the registered user authentication unit is recognized by the internal user recognition unit; and
an entry permission unit configured to execute entry permission processing for enabling the entry of the externally located person to the closed space from the entrance when the externally located person is determined as the first related person by the first related person authentication unit.

* * * * *